United States Patent
Marschall et al.

[15] 3,669,226
[45] June 13, 1972

[54] PISTON ASSEMBLY FOR DUAL-NETWORK DISK-BRAKE SYSTEM

[72] Inventors: Helmut Marschall, Frankfurt am Main; Worfgang Kammermayer, Frankfurt/Fechenheim; Hans Albert Beller, Bad Vilbel; Heinz Hahm, Walldorf/Hessen; Juan Belart, Frankfurt am Main, all of Germany

[73] Assignee: Alfred Tenes GmbH, Frankfurt am Main, Germany

[22] Filed: Dec. 18, 1970

[21] Appl. No.: 99,407

Related U.S. Application Data

[60] Division of Ser. No. 831,400, June 9, 1969, Pat. No. 3,601,233, which is a division of Ser. No. 681,330, Nov. 8, 1967, Pat. No. 3,490,565.

[30] Foreign Application Priority Data

| Nov. 16, 1966 | Germany | T 32523 |
| Dec. 16, 1966 | Germany | T 32765 |
| Dec. 16, 1966 | Germany | T 32766 |
| Dec. 16, 1966 | Germany | T 32768 |
| Dec. 16, 1966 | Germany | T 32769 |
| Dec. 17, 1966 | Germany | T 32784 |
| Dec. 17, 1966 | Germany | T 32785 |
| Dec. 7, 1967 | Germany | T 33161 |

[52] U.S. Cl. ............... 188/345, 92/75, 188/151 A, 188/351

[51] Int. Cl. ............... B60t 11/28
[58] Field of Search ........... 188/345, 151 A, 351, 196 A, 188/106 P; 60/54.5 E, 54.6 E; 92/61, 62, 75

[56] References Cited

UNITED STATES PATENTS

| 2,952,338 | 9/1960 | Oswalt | 188/351 |
| 3,125,187 | 3/1964 | Dotto | 188/351 |

FOREIGN PATENTS OR APPLICATIONS

| 1,338,610 | 8/1963 | France | 188/370 |

Primary Examiner—George E. A. Halvosa
Attorney—Karl F. Ross

[57] ABSTRACT

A vehicle-brake system having a tandem or twin master cylinder for delivering the brake fluid to independent transmission networks each connected with one compartment of a disk brake whose actuating cylinder is located on one side of the brake disk and receives at least one piston defining its working compartments or chambers therein. A pair of pistons are provided, so that the chambers are disposed to one side of the direct-acting piston while the other piston applies pressure to the brake housing or to a force-transmission frame extending around the disk. A double-acting valve maintains the effective cross-section of the actuating assembly in spite of loss of pressure in one of the transmission networks.

8 Claims, 9 Drawing Figures

PATENTED JUN 13 1972 3,669,226

Helmut Marschall
Wolfgang Kammermayer
Hans Albert Beller
Heinz Hahm
Juan Belart
INVENTORS.

BY

Karl J. Ross
ATTORNEY

H. Marschall
W. Kammermayer
Hans Albert Beller
H. Hahm
J. Belart
INVENTORS.

BY

Karl F. Ross
ATTORNEY

H. Marschall
W. Kammermayer
Hans Albert Beller
H. Hahm
J. Belart
INVENTORS.

BY

Karl J. Ross
ATTORNEY

INVENTORS:
H. Marschall
W. Kammermayer
Hans Albert Beller
H. Hahm
J. Belart
BY Karl G. Ross
ATTORNEY

PISTON ASSEMBLY FOR DUAL-NETWORK DISK-BRAKE SYSTEM

CROSS-REFERENCE TO COPENDING APPLICATION

This application is a division of copending application Ser. No. 831,400 filed 9 June 1969, now U.S. patent 3,601,233, a division of application Ser. No. 681,330 filed 8 Nov. 1967, now U.S. Pat. No. 3,490,565 issued 20 Jan. 1970.

FIELD OF THE INVENTION

Our present invention relates to improvements in dual-network brake systems and, more particularly, to a piston assembly for dual-network brakes and, especially, disk-type brakes.

BACKGROUND OF THE INVENTION

The use of so-called "dual-network" brake systems, because of increased safety, has gained in interest of late and, in fact, is required in many jurisdictions. The term "dual-network brake system" as used herein is intended to designate a vehicular brake system in which the master cylinder is subdivided into a pair of chambers, each of which may communicate with a respective compartment of a subdivided brake-fluid reservoir, and receives a respective master-cylinder piston operated by the brake pedal of the vehicle.

In so-called "tandem master cylinders," the master cylinder chambers are disposed one behind the other and the coaxially aligned but axially spaced pistons received in these chambers can be coupled by rods, springs or force-transmitting systems. From each of the master cylinder chambers, a respective fluid-transmission network of tubes or lines runs to the respective sets of wheel-brake cylinders. In general, earlier systems using dual transmission networks have connected the master-cylinder chambers with respective sets of wheel-brake cylinders. Thus, if the vehicle was equipped with front-wheel brakes and rear-wheel brakes, one transmission network communicated with all of the wheel-brake cylinders of the front-wheel brakes while the other communicated with the wheel-brake cylinders of the rear-wheel brakes; in another arrangement, a number of wheel-brake cylinders were provided on each of the wheel brakes for applying respective pads or brakeshoes against the single rotating surface at each wheel brake.

The rotating surface was either the inner face of a drum when drum-type internal-expansion brakes were employed, or a disk whose braking faces lay in planes generally transversely to its axis of rotation. In devices of the latter type, each of the hydraulic-fluid networks communicated with one of the wheel-brake cylinders of each wheel brake so that, in the event of failure in one fluid-transmission system, the other system would remain effective, albeit to a lesser degree, to brake all of the wheels. In general, disk-brake assemblies using wheel-brake cylinders mounted in opposite lobes of a support yoke extending around the periphery of the disk have proved to be of relatively complex manufacture, especially since the numerous cylinder bores must be precision-formed independently of one another.

OBJECTS OF THE INVENTION

It is, therefore, the principal object of the present invention to provide an improved disk-brake system for automotive vehicles which may be operable by dual-network master cylinders and the like and yet avoid the disadvantages of prior-art brake systems.

A corollary object of this invention is to provide an improved fluid-responsive cylinder assembly for disk-type brakes.

Yet another object of our invention is to provide an improved dual-network brake system for automotive vehicles which is of reduced cost and complexity by comparison with earlier systems.

Yet a further object of the instant invention is to provide a disk brake for automotive vehicles which can be energized from a tandem or twin master cylinder and yet has an actuating cylinder on only one side of the wheel-brake housing.

A more specific object of this invention is to provide a disk brake capable of withstanding the stresses resulting from frictional engagement of the brakeshoes with the disk and yet of relatively small dimensions and with a minimum number of parts and few force-transmitting members.

Another object of our invention is to provide a disk brake in a dual-network brake system in which the failure of one of the networks will not give rise to unduly increased brake-pedal stroke and which applies substantially the same braking frictional surface and/or brake force in spite of such failure.

SUMMARY OF THE INVENTION

We have now found that these objects can be achieved in a disk-brake system which comprises a brake housing reaching around the periphery of a brake disk connected with a wheel of the automotive vehicle and having at one side of this disk an actuating cylinder containing at least one piston subdividing this cylinder into a pair of independent working chambers effective to urge the brakeshoes flanking the disk in opposite directions against the latter, the chambers being supplied with brake fluid from respective fluid-transmission networks to which the brake fluid is delivered from dual-compartment master cylinder assemblies. The master-cylinder assemblies can include tandem-type master cylinders in which the compartments are disposed one behind the other, or so-called "twin" master cylinders in which the compartments are disposed side by side.

According to a particular feature of this invention, the brake housing is shiftable relatively to the disk and bears directly against the brakeshoe remote from the actuating cylinder so that reaction force generated by supplying fluid under pressure to the aforementioned chambers shifts the brake yoke to indirectly apply its brakeshoes to the disk.

A pair of pistons may be provided in the actuating cylinder, which defines the working chambers, and have coaxial surfaces effective in opposite directions, one of the pistons being connected with or acting upon the housing while the other bears directly upon the brakeshoe. Proximal to the actuating cylinder a two-way valve may be provided between these cylinders to bleed brake fluid under pressure to an inner chamber between the pistons and thereby ensure the application of the applied pressure over the full cross-section of the cylinder bore to both pistons regardless of failure of one of the fluid-transmission lines. In a variant of this basic system, the piston can be stepped, i.e. provided with a large-diameter portion defining an annular outer compartment and a small-diameter portion defining the other compartment.

Still another aspect of this invention resides in the mounting of the brake housing carrying the actuating cylinder fixedly with respect to the disk, whereby a force-transmission member defines the second compartment with the direct-acting piston which may also be stepped in the manner indicated. In this case, we have found it desirable to constitute the the force-transmitting member as a frame extending around the disk and the brake housing and shiftable relatively thereto, the frame lying in a plane which intersects the disk along a secant thereof. Thus, either the frame or the brake housing may be the force-transmitting member for applying the remote brakeshoe to the disk. The force-transmitting member can, in accordance with a particular feature of the invention, be mounted so as to constitute a floating or swingable element; alternatively or additionally, a parallelogrammatic linkage may be provided between this movable element and the stationary part of the vehicle body or frame, e.g. the axle housing. Moreover, we have found it to be advantageous to constitute one or both of the pistons as cup-shaped members receiving a self-adjusting mechanism for advancing the rest position of the piston to compensate for brake-lining wear and/or to lock the piston together upon failure of the fluid-transmission lines, thereby allowing one of the chambers to operate the brake as fully as if both pistons would be pressurized. In this connection, a disk-shaped piston may be provided which either serves as one of the pistons in a movable-yoke arrangement, or forms a partition between the pistons and acts as a force-transmitting member upon failure in one of the transmission lines.

Advantageously, the actuating cylinder is provided with a minimum number of sealing rings engaging the piston or pistons along their cylindrical peripheries at locations remote from the working chambers defined thereby. Moreover, the passages communicating with the chambers may open axially or radially into the latter and the brake housing or yoke, whether stationary or movable, is of a unitary construction and U-shaped configuration so as to take up the lateral stress upon the brakeshoes. We have further found that it is desirable, whether the housing is shiftable or rigid, to provide a secondary or auxiliary yoke extending around the periphery of the disk and flanking the brake housing to take up at least in part the lateral stresses derived upon engagement of the brakeshoes with the disk.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
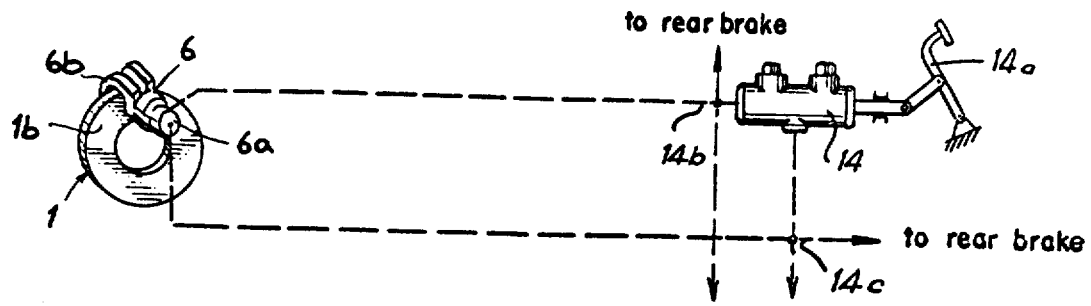
FIG. 1 is a diagrammatic view of a vehicle-brake system using a tandem master cylinder.
Figure 1A:
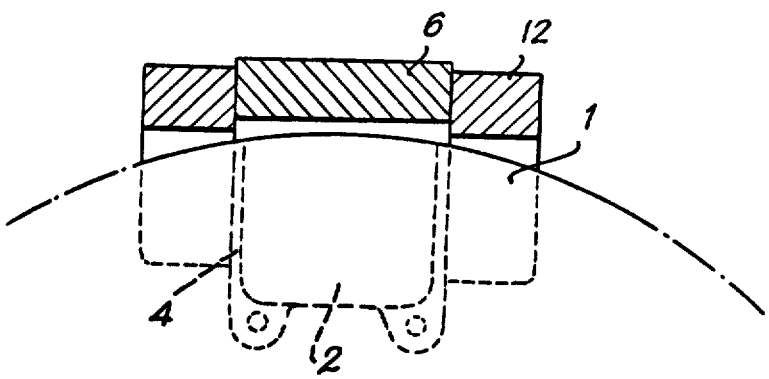
FIG. 1a is a cross-sectional view showing how the yoke of FIG. 1 is supported laterally.

In FIGS. 1 and 1a, we show a disk-brake system in which the unitary, U-shaped brake yoke 6 is provided with a single-step cylinder 6a at the right-hand lobe of the yoke and reaches around the periphery of the brake disk 1 with a flange 6b to engage a brakeshoe whose lining confronts the braking surface or face of the disk 1. The lining is bonded to a backing plate which is affixed to the downwardly turned flange 6b of the yoke 6.

A frame 12 is provided to flank the yoke 6 (see FIG. 1a) and take up the torque applied to this frame when the yoke 6 seizes the disk 1 at 12'. This auxiliary yoke or frame 12 is secured to the vehicle shaft, body or chassis frame so as to be rigid therewith.

Figure 1B:
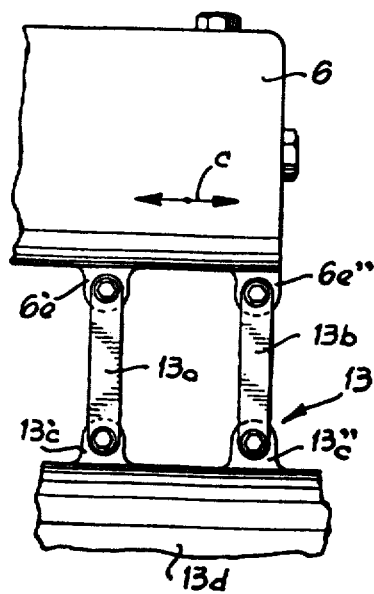
FIG. 1b is an elevational view showing a parallelogrammatic linkage coupling the brake housing of FIG. 1 with a stationary portion of the vehicle, namely its axle housing.

The yoke 6 can, of course, form part of a floating or oscillating (swingable) housing structure of the type conveniently used in disk brakes in which the yoke is movable to permit the actuating means to be disposed at only one side of the disk. An assembly of this character may also be formed with a paral- lelogrammatic linkage 13 as illustrated for example in FIG. 1b. Thus, the yoke 6 may be provided with a pair of lugs 6e' and 6e'' in axially spaced relation in which a pair of parallel links 13a and 13b are pivotally mounted. The links 13a and 13b may also be pivotally connected at their opposite ends to lugs 13c', 13c'' coplanar with the lugs 6e' and 6e'' spaced apart by identical distances.

The lengths of the links 13a and 13b are identical. Consequently, the distance between the axes of lugs 6e' and 6e'' forms one fixed-length arm of the yoke 6 while the other arm is defined between the lugs 13c' and 13c'' of the axle housing 13d. One or more of the pivots joining the arms 13a and 13b with the lugs may be provided with a friction member preventing displacement of the linkage 13 except under the hydraulic action of the brake.

The yoke 6, however, will move parallel to itself as represented by arrow C. It will be understood that the frame 12 or the linkage 13 may be used for the brake yokes of all subsequently described embodiments whenever a movement of the yoke relative to the disk is required to transfer force to the brakeshoe opposite the side of the yoke in which the actuating cylinder is provided. Moreover, the linkage 13 can be considered representative of both swingable and floating yokes since, while the yoke 6 moves parallel to itself (arrow C), it nevertheless swings about the pivots formed by the lugs 13c' and 13c'' and shifts axially as a floating-yoke housing.

Reverting to FIGS. 1 and 1a, it can be seen that the assembly of FIG. 1 is supplied with brake fluid from a tandem master cylinder 14 which is actuated by a brake pedal 14a to displace brake fluid into the independent fluid-transmission networks 14b and 14c. Further wheel brakes may be energized in parallel. Thus the network 14b communicates with one working chamber behind the piston face 15 while network 14c communicates with the other working compartment of the wheel brake. The tandem cylinder 14 is representative of the two-compartment master cylinders designed to function with each of the wheel-brake arrangements described below.

In normal operation, depression of the brake pedal 14a drives hydraulic fluid simultaneously to both networks 14b and 14c, thereby distributing it similarly to the wheel brakes 15, etc. of the vehicle. In FIG. 1, the comfiguration of only one of these wheel brakes is shown, although it will be understood that all of the wheel brakes are similarly constructed.

Figure 2:
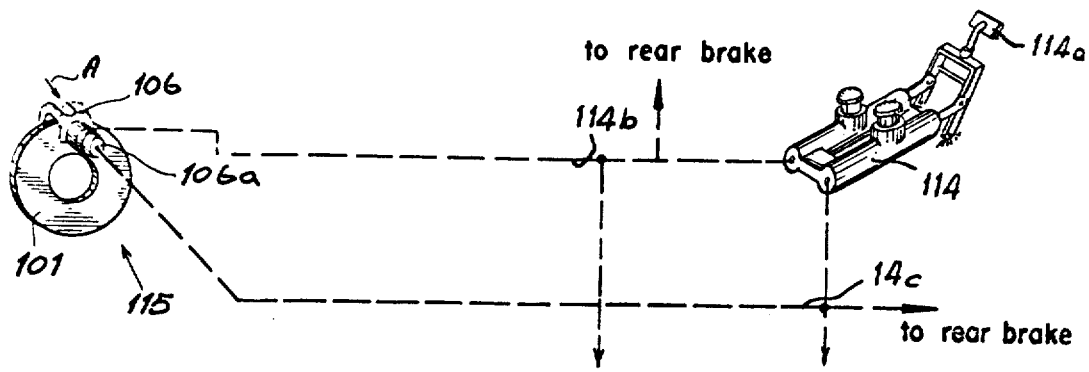
FIG. 2 is a view similar to FIG. 1 of a system with twin master cylinder.

In FIG. 2, we show another embodiment of this invention wherein the U-shaped yoke 106 extending around the periphery of the disk 101 draws a brakeshoe thereagainst when hydraulic fluid is supplied to the cylinder lobe 106a of the brake, as is described below. Along the other flank of the disk 101, we provide a brakeshoe whose lining engages the disk 101 when urged in the direction A by a piston structure slidable in the cylinder as described hereinafter.

In this embodiment, the master cylinder 114 is of the twin-cylinder type which in the cylinder chambers are disposed side by side for joint operation by the brake pedal 114a. All of the wheel brakes may be of the construction illustrated in section in FIG. 2 and may be operated in parallel. The yoke 106 may be mounted in the frame illustrated at 12 in FIG. 1a and may be a floating or swingable yoke, as previously described, and can be provided with the parallelogrammatic linkage 13 in FIG. 1b. It will be understood that FIGS. 1a and 1b correspond to views of the assembly in FIG. 2 provided with these variants. Moreover, the twin cylinder 114 will be understood as suitable for use with the wheel brakes of any of the preceding and succeeding Figures.

Figure 3A:
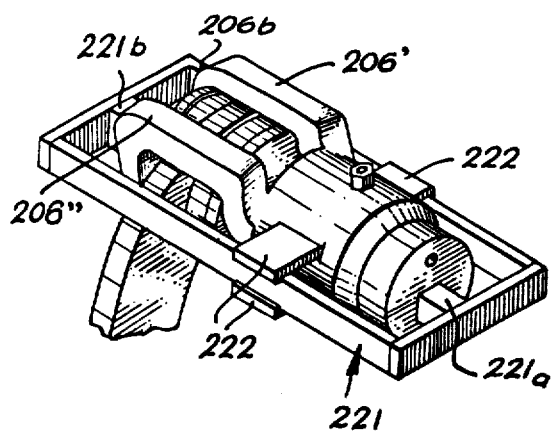
FIG. 3a is a perspective view diagrammatically illustrating the relationship of the frame to the brake housing.
Figure 3:
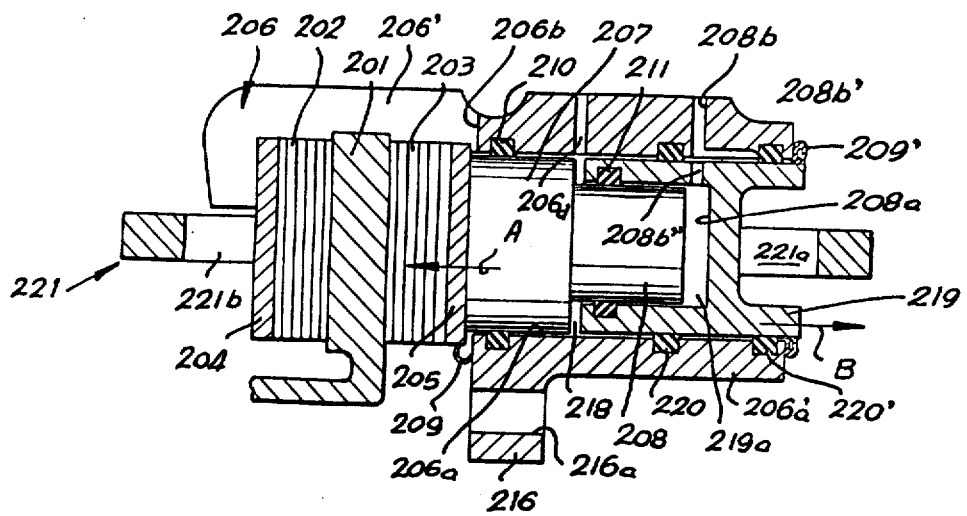
FIG. 3 is a fragmentary axial cross-sectional view a disk brake having a force-transmission frame, a stepped piston and a relatively stationary brake housing.
Figure 3B:
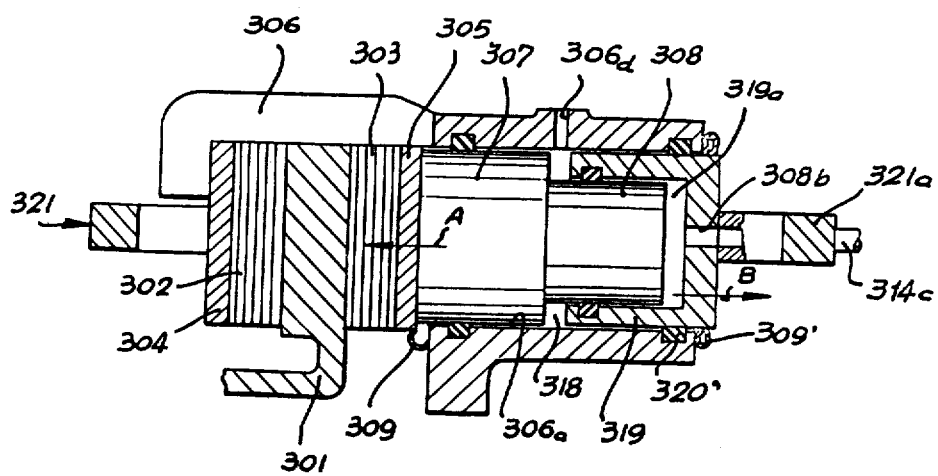
FIG. 3b is an axial cross-sectional view of a modification of the system of FIG. 3.

In FIGS. 3, 3a and 3b, we show an embodiment of a system suitable for use with that of FIG. 1 or FIG. 2 wherein a unitary stepped piston on one side of the brake housing is slidably received in a pair of working chambers supplied from individual compartments of the master cylinder. In the system of FIG. 2, by contrast, the stepped bore is provided in the axially shiftable housing, which, as has been indicated, is a floating, swingable or similar yoke (e.g. connected via the parallelogrammatic linkage 13 with the vehicle frame). In the system of FIGS. 3, 3a and 3b, a simplified force-transmission structure is illustrated.

Referring initially to FIG. 3, it can be seen that the basic components of this modification consist of a generally U-shaped yoke 206 whose bifurcate arms 206' and 206'' reach around the periphery of the disk 201 which, as has been previously indicated, is coupled with the rotatable portion of the vehicle-wheel assembly, e.g. the tire-carrying disk and axle. The yoke or housing 206 is affixed at the right-hand side to the axle housing or vehicle frame by a flange 216 whose bores 216a receive bolts for attaching it to the axle housing as is conveniently done with fixed-yoke disk brakes. Between the arms 206' and 206'' of the yoke, which serves to retain the brakeshoes 202, 204 and 203, 205, an opening 206b may be provided to permit inspection of the brakeshoes and to facilitate access thereto.

The cylinder 206a' of the yoke is formed with a single-diameter bore 206 in which the stepped piston 207, 208 is axially shiftable. The larger-diameter step 207 bears directly upon the backing plate 205 whose brakeshoe lining 203 confronts the right-hand side of the brake disk 201 and defines within the bore 206a a large-diameter working chamber 218 to which fluid is supplied through a radial bore 206d from one of the compartments of a dual-network master cylinder, e.g. the twin master cylinder of FIG. 2 or the tandem master cylinder of FIG. 1 via the respective brake-fluid networks 14b, 14c or 114b, 114c.

An essential feature of this aspect of the invention is the provision of an inwardly open hollow piston 219 which is axially telescoped with the small-diameter step 208 and defines the small-diameter chamber 219a therewith. The working face 208a of member 219 is effective, upon the delivery of brake fluid to the chamber 219a to urge the brakeshoe 202, 204 to the right (arrow B), as is described in greater detail hereinafter. For delivery of fluid to the chamber 219a, we provide a radial bore 208b in the cylinder portion 206a' of the housing 206 which communicates with the other transmission networks and the other working compartments of the master cylinder. The bore 208b is connected with an axially extending recess 208b' confronting the piston 219 which is axially shiftable in the cylinder bore 206a and registering with a radial passage 208b'' in this piston. A single annular seal 210 recessed in the wall of bore 206a engages the large-diameter step 207 at a location remote from its chamber 218, while a further seal 211 recessed in the interior of piston 219 engages the small-diameter step 208 at a location remote from chamber 219a. The additional seals 220 and 220' prevent leakage between the piston 219 and the housing 206. A pair of cuffs 209' bridge the cylinder 206a and the backing plate 205 and piston 219, respectively, to prevent entry of contaminants into the cylinder bore.

The force-transmission means of this modification comprises a frame 221 (see FIG. 3a) which lies in a plane parallel to the axis of the cylinder bore 206a and perpendicular to the braking faces of the disk, generally along a secant of the disk. This frame 221 has inward projections 221a and 221b bearing upon the backing plate 204 of the left-hand brakeshoe whose lining 202 confronts the disk 201, and upon the outer surface of the piston 219. Thus, when the piston 219 is urged in the direction of arrow B, the frame 221 transfers corresponding movement to the brakeshoe 202, 204 and draws the latter against the left-hand side of the disk. To prevent rotation of the piston 219 and the frame relatively to the fixed housing 206, the frame 221 may be guided between lugs 222 extending laterally from the housing 206 (see FIG. 3a).

When neither fluid-transmission network is defective, fluid under pressure is delivered simultaneously to the chambers 218 and 219a, thereby urging the piston 207, 208 to the left (arrow A), while the reaction force is applied to piston 219 to drive the brakeshoe 202, 204 to the right (arrow B). If one of the brake-fluid networks fails, for instance the network supplying chamber 219a, fluid will be delivered in the usual manner to the outer annular compartment 218 and thereby urge the large-diameter step 207 in the direction of arrow A, and the piston 219 in the direction of arrow B, as previously described. Conversely, failure of the network supplying chamber 218 will nevertheless permit fluid to be delivered to chamber 219a, thereby urging the small-diameter step 208 in the direction of arrow A, and the piston 219 in the direction of arrow B. In either case, the stroke of the brake pedal necessary for actuating the brake remains constant in the event of failure of one of the transmission networks, although the amount of foot pressure required for the same braking effect is double. Here again, failure of one of the transmission networks does not decrease the frictional area of the brake which is affected.

FIG. 3b shows a modification of the system of FIG. 3, although the view of FIG. 3a pertains as well to this Figure. The brake fluid from line 314c is here delivered through the frame 321, and the projection 321a to an axial bore 308b in the piston 319 which is axially shiftable in the cylinder bore 306a of housing 306. The intermediate seal 220 is eliminated and only a single seal 320' need engage the outer periphery of piston 319 at a location remote from the chamber 318. Fluid is delivered to this chamber by a radial bore 306d in the housing 306, as previously described. The stepped piston 307, 308, the piston 319 and the brakeshoes 303, 305 and 302, 304 cooperate with the disk 301, as described in connection with FIGS. 3 and 3a. In both of these systems, the circumferential entrainment of the brakeshoes is blocked by the fixed yoke 206, 306. Furthermore, the yoke 206 may be flanked by the auxiliary yoke structure shown at 12 in FIG. 1a.

Figure 4:
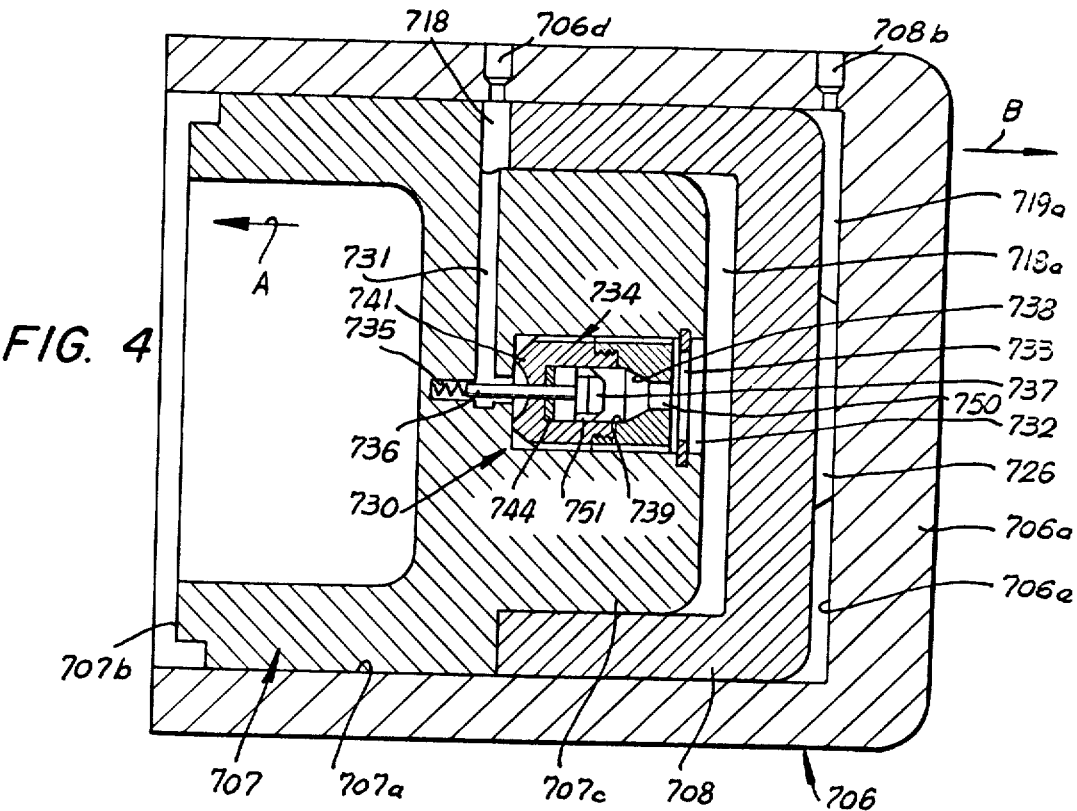
FIG. 4 is a diagrammatic axial cross-sectional view drawn to a greatly enlarged scale showing double-acting valve means for maintaining the effective cross-section of the actuating cylinder constant in spite of failure in one of the transmission lines.
Figure 5:
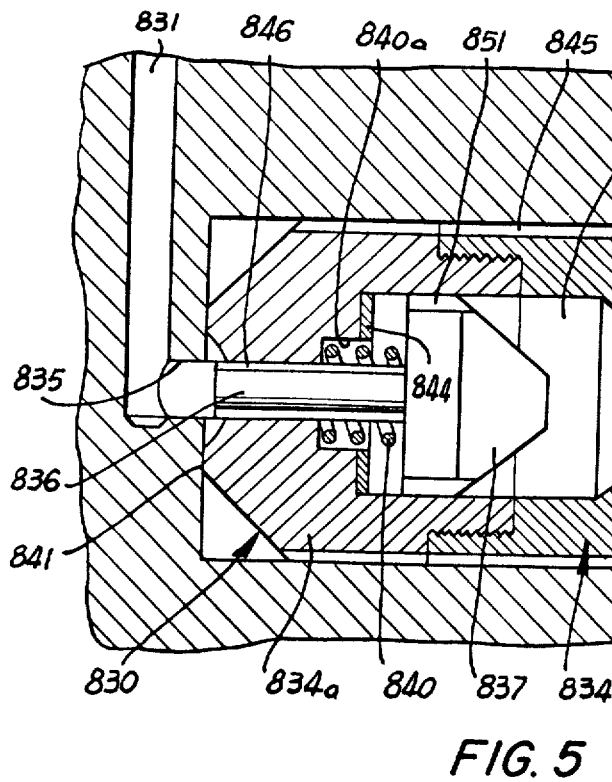
FIG. 5 is an enlarged detail view of a valve of the type suitable for use in the system of FIG. 4, but with some modifications.

In FIGS. 4 and 5, we show a valve assembly for a stepped-piston construction in which the brake force is maintained substantially constant in spite of the face that there is a failure in one of the brake-supply networks. According to this aspect of the invention, the stepped piston is slidable relatively to a cup-shaped further piston (see FIG. 3) so that an annular chamber is defined between the two pistons while a further chamber is formed behind the piston receiving the small-diameter step. In this system, a space formed between the small-diameter step and the cup-shaped piston communicates with the annular chamber and its supply port via a double-acting pressure-responsive valve which, upon failure of the fluid supply behind the nonstepped piston, will deliver substantially full brake pressure to the inner chamber so that substantially the full effective cross-section of the stepped piston operates in braking action. Upon failure of the fluid supply to the outer chamber, the valve is effective to drain the inner chamber and permit direct contact between the non-stepped piston and the stepped piston so that full brake force is again delivered.

Thus we show in FIG. 4 a wheel-brake cylinder 706a which may be used in any of the assemblies previously described, for example, as part of a housing 706 which extends around the periphery of a brake disk and cooperates with brakeshoes as described in connection with these Figures. An inlet port 706d delivers brake fluid from one of the transmission networks (14b or 114b) and a corresponding dual master cylinder to an annular compartment 718 defined with the large-diameter step 707a of a stepped piston 707 which bears at 707b against one of the brakeshoes. The other brakeshoe is entrained by the yoke 706 which has the U-shaped configuration previously described and may be a floating, swingable or like housing, e.g. provided with the parallelogrammatic linkage 13 of FIG. 1b. Additionally, the auxiliary yoke 12 of FIG. 1a may be used to provide lateral support for the housing and take up the lateral forces upon the brakeshoes. A piston 708 of cup-shaped configuration opens in the direction of piston 707 and can bear against the end wall 706e of the cylinder 706a via a boss 726. A chamber 719a is thus defined behind the piston 708 and receives brake fluid from the other network (14c or 114c) via a radial bore 708b.

According to the principles of this invention, however, a further, inner chamber 718a is formed between the small-diameter step 707c of the piston 707 and piston 708, while a double-acting pressure-operated valve 730 connects the chamber 718 and passage 706d via a radial bore 731 in the piston 707 with the chamber 718a.

Referring now to FIG. 5, in which the valve structure is drawn to an enlarged scale but is otherwise similar to that of FIG. 4 but for slight variations described hereinafter, it can be seen that the valve 730 or 830 comprises a cylindrical bore 732, 832 in which a split ring 733, 833 is seated to form a stop for a valve plunger 734, 834. The plunger 734, 834 may be bipartite and composed of a pair of coaxially interconnected threaded sleeves as shown at 834a and 834b. The radial bore 731, 831 communicates with an axial passage 735, 835 receiving the stem 736, 836 of a frustoconical valve body 737, 837. The front end of this valve body is designed to seat against a frustoconically convergent valve seat 738, 838 at the end of a conically narrowing chamber 739, 839 tapering away from the bore 735, 835. A coil spring 740, seated in a blind end of bore 735, urges the stem 736 and the valve member 737 to the right while the corresponding spring 840 of the embodiment of FIG. 5 is received in an enlargement or countersunk recess 840a in the left-hand end of the valve plunger 834. The plunger 734, 834 has a tapered end at its left-hand side so that a sealing edge 741, 841 engages the wall of the bore 832 around the axial passage 735, 835. The plunger 834 in the embodiment of FIG. 5 is urged to the left by a coil spring 842 bearing against a shoulder 843 and guided around the plunger 834. At its other end, the coil spring 842 rests against the split ring 833. Within the chamber 739, 839 we provide an annular valve seat 744, 844. Additionally, the outer periphery of plunger 734, 834 is fluted as shown at 845 while flutes are provided (e.g. at 846) around the stem of the valve member. The stem 836 can be similarly fluted or received with slight clearance in its bore. The recess 848 for spring 840 is dimensioned to prevent the spring from interfering with the seating of valve member 837 upon the ring 844. Spring 842 (and a corresponding spring, not shown, acting on plunger 734) prevents the plunger from floating in the absence of fluid-pressure bias in one or the other direction and maintains a light force urging the plunger into seating engagement with the wall of the bore 832 surrounding the passage 735, 835.

During normal brake operation, the tandem or twin master cylinder (14 or 114) delivers hydraulic pressure to both passages 706d and 708b, thereby driving the valve member 737, 837 to the right and blocking the outlet passage 750, 850 from the chamber 739, 839. Further pressure delivered at bore 735, 835 lifts the plunger 734, 834 away from its seat (to the right) and delivers fluid to the chamber (718a) between the pistons 707 and 708. Piston 707 is driven to the left with a force determined by its entire effective cross-section since fluid pressure is applied in chamber 718a as well as in chamber 718. Under most conditions, however, the same pressure is generated in chamber 719a so that the pressure in chamber 718a does not materially change and the assembly 707, 708 is displaced in the direction of arrow A while the housing 706 is shifted in the direction of arrow B to apply full brake force to both brakeshoes in the usual manner. Upon release of the brake, fluid is drained from the chamber 718, 718a, and 719a in the usual manner, the fluid from chamber 718a passing the flutes or the axial grooves 751, 851 around the valve member 737, 837. It is also possible to eliminate the grooves 851 in which case the member 737 or 837 fits snugly in the bore 739, 839 and is driven to the left when the brake is released until it engages the valve seat 744,844.

Upon failure of the rear fluid-transmission network, pressure does not develop in chamber 719a and, when the brake pedal is depressed, the piston 708 is urged into direct contact with the housing 706 and chamber 718a expands and is fully pressurized in the manner described.

Upon failure of the other network, fluid is supplied only through passage 708b to chamber 719a, whereupon chamber 718a is compressed and pressure built up therein. The valve member 737, 837 is driven to the left until it engages the seat 744, 844 and thereby prevents further escape of the fluid from chamber 718a. The fluid, being relatively incompressible, acts as a force-transmitting member affording direct mechanical connection between piston 708 and piston 707 thereby actuating the brakeshoe of the latter with full brake pressure. In the event of a leakage in valve 730, 830, the piston 708 bears directly against piston 707. In other words, the valve 730, 830 functions as a self-adjusting mechanism. In the event of a sudden release in pressure in line 731, 831, there is a tendency for the valve member 737, 837 to be driven into its left-hand position. Only when pressure is restored, can fluid be bled from chamber 718a. Thus a failure in one or the other transmission network is automatically compensated by a spreading of the pistons without increased stroke of the brake pedal. Consequently, the driver has no warning of a brake failure and we, therefore, prefer to provide indicator means of any conventional type to indicate such failure in one of the networks.

We claim:

1. A vehicle-brake system comprising dual-compartment master-cylinder means for independently displacing at least two brake-fluid streams; a pair of transmission networks each connected to one of said compartments for transmission of the brake fluid displaced from said compartments; and at least one disk brake including a rotatable brake disk, a nonrotatable housing reaching around the periphery of the disk and forming on one side thereof an actuating cylinder, a pair of brakeshoes flanking said disk including a first brakeshoe remote from said cylinder and in force-transmitting relationship therewith and a second brakeshoe proximal to said cylinder, and at least one piston received in said cylinder and acting upon said second brakeshoe proximal thereto while subdividing said cylinder into a pair of independent working chambers respectively communicating with said networks and individually pressurizable thereby to displace said brakeshoes against said disk, said piston being stepped and having a large-diameter portion defining one of said chambers and a small-diameter portion surrounded by said one of said chambers, said system further comprising a generally cup-shaped second piston shiftable in said cylinder and in force-transmitting relationship with said first brakeshoe while forming a pressurizable space with said small-diameter portion of the first-mentioned piston, said second piston defining the other working chamber and having an effective area equal substantially to the collective effective areas of said space and said one chamber, and pressure-responsive valve means connecting said one chamber with said space and operable upon failure of the pressure in said other working chamber to open communication between the network supplying said one chamber and said space.

2. The system defined in claim 1 wherein said housing is a floating yoke.

3. The system defined in claim 1 wherein said housing is a swingable yoke.

4. The system defined in claim 1, further comprising a parallelogrammatic linkage connected to said housing for movably supporting same relatively to said disk.

5. The system defined in claim 1 wherein said valve means is double-acting and, upon pressure release in said one chamber permits at least limited drain of fluid from said space.

6. The system defined in claim 5 wherein said valve means includes a throttle valve effective upon pressurization of said other working chamber and depressurization of said one chamber to block escape of fluid from said space.

7. The system defined in claim 6 wherein said valve means comprises an axial bore formed in said small-diameter portion of said one piston and open toward said space, a passage formed in said one piston and connecting said one chamber with said bore, a tubular plunger shiftable in said bore and defining a throttle aperture for said valve, and a throttle-valve member axially shiftable in said plunger and spring-biased in the direction of said aperture.

8. The system defined in claim 7 wherein said plunger forms a seat surrounding said passage and engageable with said member upon decrease in the pressure in said one chamber, means forming fluid-flow channels around said plunger and said member when said member is disengaged from said seat, said plunger surrounding said passage abd forming a further valve permitting flow of fluid from said passage into said space but blocking reverse flow.

* * * * *